UNITED STATES PATENT OFFICE.

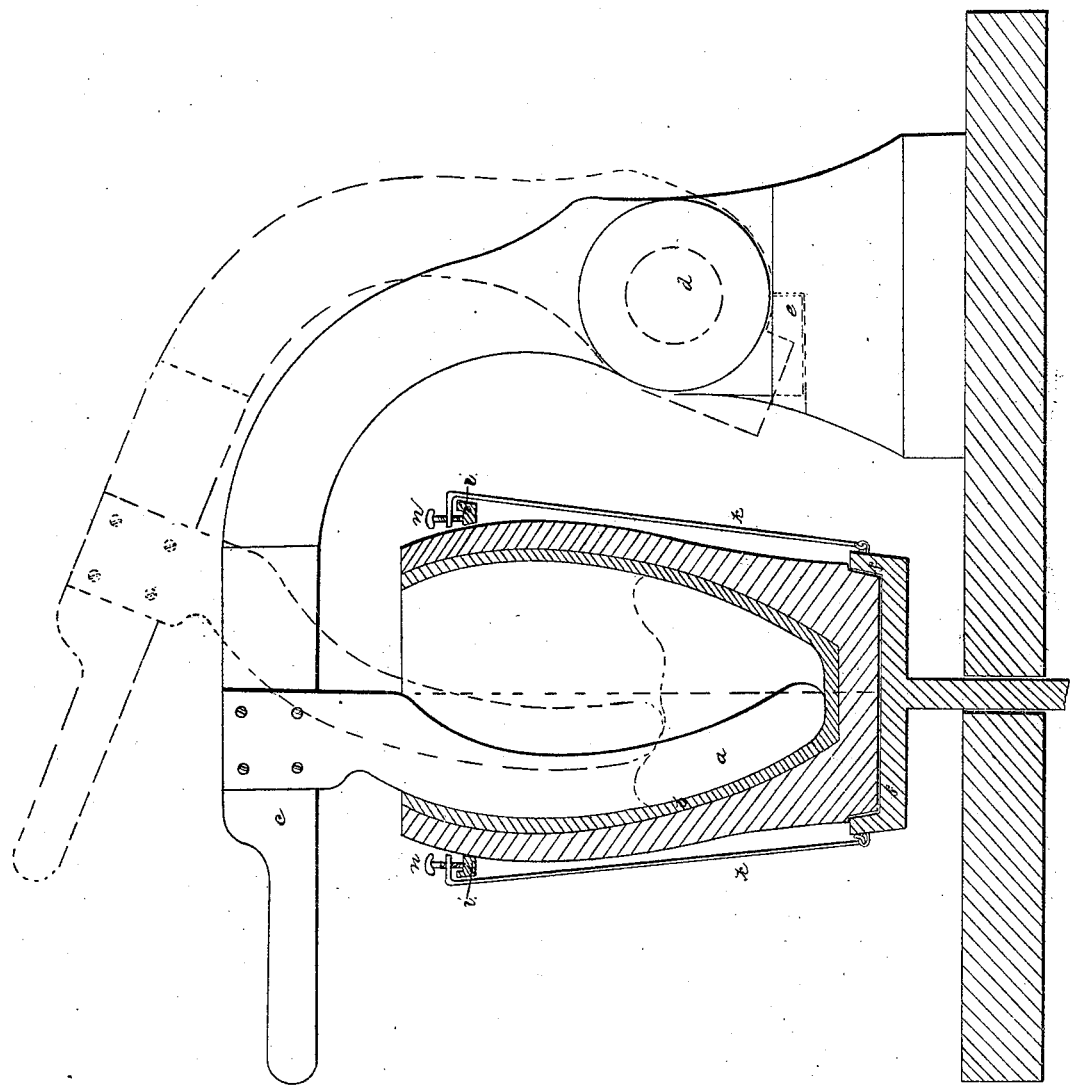

THOMAS G. FRENCH, OF JERSEY CITY, NEW JERSEY.

IMPROVED CRUCIBLE-MOLD.

Specification forming part of Letters Patent No. 50,812, dated November 7, 1865.

*To all whom it may concern:*

Be it known that I, THOMAS G. FRENCH, of Jersey City, Hudson county, State of New Jersey, have invented certain new and useful Improvements in Molding Crucibles and other Articles of Plastic Material; and I do hereby declare that the following is a full, clear, and exact description of the same, reference being made to the annexed drawing, making a part of this specification, which is an elevation, partly in section, of my invention.

In the manufacture of crucibles and other vessels of plastic material, a "former" of some kind has long been employed to give shape to the interior while the vessel was being turned on the "jigger" or upright lathe. In the case of crucibles it is particularly desirable that all of a lot should be of uniform size and thickness. The size externally is controlled by the mold in which it is made, while the accuracy of the interior is due to the means by which the forming-tool is governed in its action. Many devices have been made for moving this up gradually, so as to spread the plastic material upon the interior of the mold and finally holding it firmly at the position which will give the required thickness, but all of these have been found defective in some respect.

By my improvement the action of the forming-tool is governed with unerring exactness; and it consists in mounting the former upon a fixed center, so placed with reference to the curve of the forming-edge that when said former is lifted out of the finished crucible the first act of moving it shall also withdraw it from contact with the crucible.

Another portion of my improvements is, in the manner of holding the sections of the mold together and of securing them upon the chuck.

In the drawing, $a$ represents the forming-tool shown as within a finished crucible, $b$. It is firmly affixed to a lever, $c$, which is bent at the end opposite to the edge of $a$, and secured by a bolt at $d$ upon the bed in which the spindle works, and upon which bolt it can be turned freely. This fixed center must be so placed in its relation to the forming-tool that when said tool enters the mass of plastic material, as in the position shown in red lines, it will, on being turned farther on the center $d$, approach the side of the mold until arrested by a stop, as at $e$, which governs the thickness of the crucible.

The molds employed are usually of plaster-paris and divided longitudinally into two parts, in order that the crucible may be more readily taken out when sufficiently dry. These molds are set in a hollow chuck, $f$, and are confined together at top by a hoop. This hoop I make with a groove around its upper side, as shown in the sectional view at $i$. Upon the chuck I hinge, at equal distances apart, two or more bars of metal, $k$, the upper ends of which are turned over as shown, and have in each a screw, $n$, which will enter the groove, and when screwed down will hold the sections of the mold firmly together, as well as confine them to the chuck.

In operation, the lever $c$ is turned over upon the center $d$ until the former $a$ is entirely out of the way. The sections of the mold are then put upon the chuck and secured by the hoop and bars $k$. The proper weight of plastic material is then put into the mold. To facilitate the work this may be spread somewhat with the hand, and the former being then brought down upon it, the material will be evenly spread upon the interior of the mold as that is revolved. The pressure on the handle of $c$ is to be continued until it strikes its stop, thus giving density and finish to the crucible. By now turning the lever $c$ back upon $d$ the former will be moved away from the surface of the crucible, and, continuing the motion, will be withdrawn from the crucible. The screws $n$ are then to be released, the mold taken away from the chuck and set away for the crucible to dry in it, as is usual in pottery-work when plaster molds are used. Mounted in this manner the forming-tool can be brought into use or removed out of the way very simply and readily.

I claim—

1. Mounting the forming-tool for the interior, substantially as and for the purpose set forth.

2. Securing the mold in the chuck by means of the screwed bars $k$, and grooved-hoop, substantially in the manner set forth.

In witness whereof I have hereunto subscribed my name.

THOMAS G. FRENCH.

Witnesses:
J. P. PIRSSON,
S. H. MAYNARD.